Patented Jan. 9, 1934

1,942,778

UNITED STATES PATENT OFFICE

1,942,778

CASTOR OIL DERIVATIVE DRYING OIL AND PROCESS OF PRODUCING THE SAME

Johannes Scheiber, Leipzig, Germany

No Drawing. Application February 7, 1929, Serial No. 338,318, and in Germany February 20, 1928

8 Claims. (Cl. 260—8)

For the manufacturers of varnishes, paints and the like of any kind with fatty oils etc. as a basis, only such natural fatty oils have been used heretofore, which display good capacity for drying. This is especially the case with wood-oil and linseed oil, whereas poppy-seed oil and nut-oil leave much to be desired in a paint-technical respect. Olive-oil and similar non-drying products must even be rejected. Castor oil is also unsuitable to be used for the preparation of varnishes and paints owing to its lack of drying. Of course, such oil can be caused to dry by sufficiently long continued heating, whereby it is thickened to some extent. In any event, the products so obtained can at best be used as additions to other products in the manufacture of which wood-oil or linseed-oil have been employed.

By a chemical treatment castor-oil can be changed in such a manner, that the products derived from it surpass in drying capacity not only linseed-oil but will compare well with wood-oil. The possibility of attaining that result is due to the fact that the principal acid of the castor oil, viz. the ricinoleic acid is an unsaturated hydroxyacid of the formula:

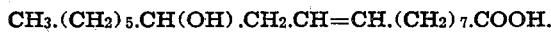

If water be split off from that product in the following manner

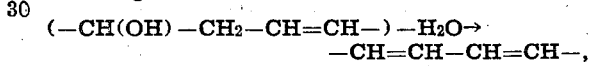

a new double link is formed which, surprising to say, takes up a neighbouring position to the double link already existing. Consequently, it is possible to convert the ricinoleic acid nearly completely into an unsaturated fatty acid with two double links in a neighbouring position i. e., into the so called octadekadienic-9, 11-acid-1 of the formula

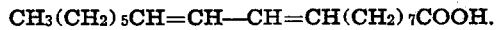

The product thus obtained must be deemed fully analogous with elæostearic acid which represents the principal acid in Chinese wood-oil and is an unsaturated acid with three double links in a neighbouring position or octadekatrienic-9, 11, 13-acid-1 of the formula

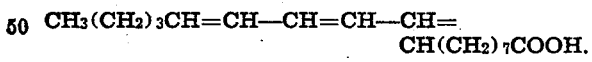

This is shown by the fact that the doubly unsaturated acid produced from the ricinoleic acid or octadekadienic acid yields on esterification with glycerol an oil, which as regards its principal properties is analogous with wood-oil. It is therefore possible to convert the ricinoleic acid or the castor oil into a product which is an excellent raw-material for paints and the like.

This is practically accomplished by depriving the ricinoleic acid in a suitable manner of the elements of one molecule of water. This is effected by heating the ricinoleic acid first above 200° C.; preferably with the addition of suitable catalyzers, such as alumina, fuller's earth, silica gel, iron oxide, metallic iron etc. and completing the process by a distillation in vacuo.

The products thus obtained are not suitable for being worked up directly as painting preparations. But this may be done by allowing the free acid to react with polyhydric alcohols which results in the formation of large initial molecules, so that the subsequent polymerization, which plays a great part in the drying process can create molecules of such size that they act as film-formers.

The following specific examples will serve to illustrate the manner of practicing my invention, although it is to be understood that the invention is not limited to such examples.

Example I

Octadekadienic acid produced by a distillation of ricinoleic acid in vacuo (which may previously be submitted to a heating for some time at ordinary pressure in the presence or absence of suitable catalyzers) is heated with the equivalent quantity of a suitable polyhydric alcohol, say glycerol, until a practically neutral product is formed. This has an oily consistency and exhibits a drying capacity lying between that of linseed-oil and wood-oil. The oil can be converted into a quick drying product by means of the customary siccatives, but may equally well be boiled to a kettle bodied oil or a blown oil and then be worked up into varnishes or paints of any kind, as is well known and customary for wood-oil or linseed-oil. All products thus obtained are distinguished by a good drying capacity, a high brilliancy, a good adhesive capacity and especially by a great resistance to water, weak alkalies and acids.

Example II

Octadekadienic acid produced from ricinoleic acid by distillation in vacuo, as in Example I, may at the same time be reacted upon with other unsaturated fatty acids by suitable polyhydric alcohols. If for instance, equal quantities of the octadekadienic acid and of the mixture of the acids from linseed-oil be used besides an equivalent quantity of glycerol and so forth, mixed glycerides are produced, the properties of which lie between boiled linseed-oil and boiled wood-oil. The mixed glycerides may be employed for all painting and coating purposes for which boiled linseed-oil and wood-oil are usable.

Example III

The Example II can also be varied by employing instead of the acid-mixture from linseed-oil the linseed-oil or another fatty oil directly and heating it with the octadekadienic acid produced from ricinoleic acid by a distillation in vacuo. A far reaching exchange of the fatty acids in the glycerol-complexes quickly ensues. Subsequently to the first heating a reaction or neutralization is effected with a suitable polyhydric alcohol, say glycerol, in a quantity equivalent with the free fatty acids present. The products obtained are similar to those made by Example II.

For the purposes of the present invention it will be understood, that by the term "ricinoleic acid" I mean the technical mixture of the fatty acids produced by the splitting up of castor oil. It is immaterial whether the splitting is effected by means of alkalies, the so-called Twitchell's reagent or of a ferment.

As polyhydric alcohols primarily glycerol and glycol should be used, but I can also employ with equally good result higher polyhydric alcohols, for instance erythrite or mannite and so forth.

What I claim is:—

1. In the process of producing a fatty drying oil from castor oil, the step which consists in reacting octadekadienic-9, 11-acid 1 having the formula $CH_3(CH_2)_5CH=CH-CH=CH(CH_2)_7COOH$ with an aliphatic polyhydric alcohol.

2. In the process of producing a fatty drying oil from castor oil, the step which consists in reacting octadekadienic-9, 11-acid 1 having the formula $CH_3(CH_2)_5CH=CH-CH=CH(CH_2)_7COOH$ and unsaturated fatty acids of natural drying oils with an aliphatic polyhydric alcohol.

3. In the process of producing a fatty drying oil from castor oil, the step which consists in reacting octadekadienic-9, 11-acid 1 having the formula $CH_3(CH_2)_5CH=CH-CH=CH(CH_2)_7COOH$ with glycerol.

4. In the process of producing a fatty drying oil from castor oil, the step which consists in reacting octadekadienic-9, 11-acid 1 having the formula $CH_3(CH_2)_5CH=CH-CH=CH(CH_2)_7COOH$ and unsaturated fatty acids of natural drying oils with glycerol.

5. A reaction product comprising an ester of an aliphatic polyhydric alcohol and octadekadienic-9, 11-acid 1.

6. A reaction product comprising an ester of an aliphatic polyhydric alcohol, octadekadienic-9, 11-acid 1 and unsaturated fatty acids of natural drying oils.

7. A reaction product comprising esters of glycerol and octadekadienic-9, 11-acid 1.

8. A reaction product comprising esters of glycerol, octadekadienic-9, 11-acid 1, and unsaturated fatty acids of natural drying oils.

JOHANNES SCHEIBER.